No. 711,224. Patented Oct. 14, 1902.
F. POHLEY.
POULTRY DRINKING FOUNTAIN.
(Application filed Mar. 7, 1902.)
(No Model.)

Witnesses,

Inventor,
Frederick Pohley
By Dewey Strong & Co.
attys

UNITED STATES PATENT OFFICE.

FREDERICK POHLEY, OF WINDSOR, CALIFORNIA.

POULTRY DRINKING-FOUNTAIN.

SPECIFICATION forming part of Letters Patent No. 711,224, dated October 14, 1902.

Application filed March 7, 1902. Serial No. 97,029. (No model.)

*To all whom it may concern:*

Be it known that I, FREDERICK POHLEY, a citizen of the United States, residing at Windsor, county of Sonoma, State of California, have invented an Improvement in Poultry Drinking-Fountains; and I hereby declare the following to be a full, clear, and exact description of the same.

My invention relates to drinking-fountains for poultry and the like.

It consists of the parts and the constructions and combinations of parts hereinafter described and claimed.

Figure 1:
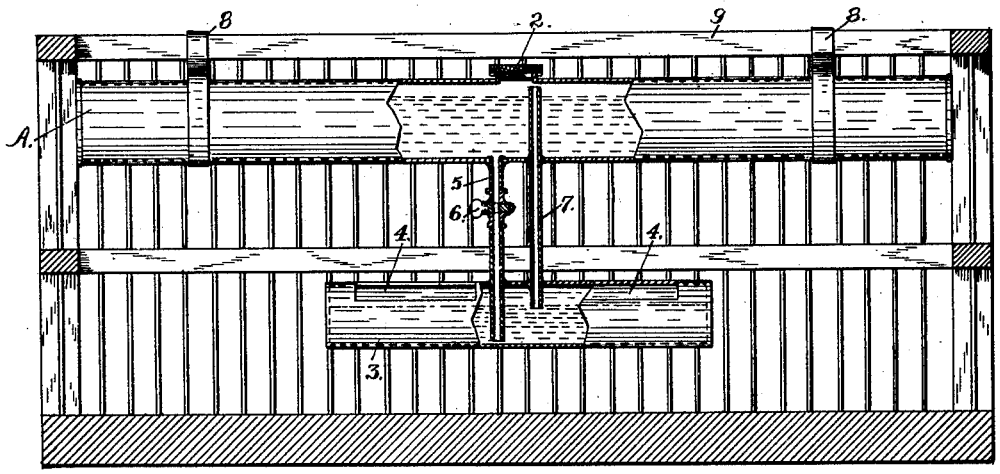
Figure 2:
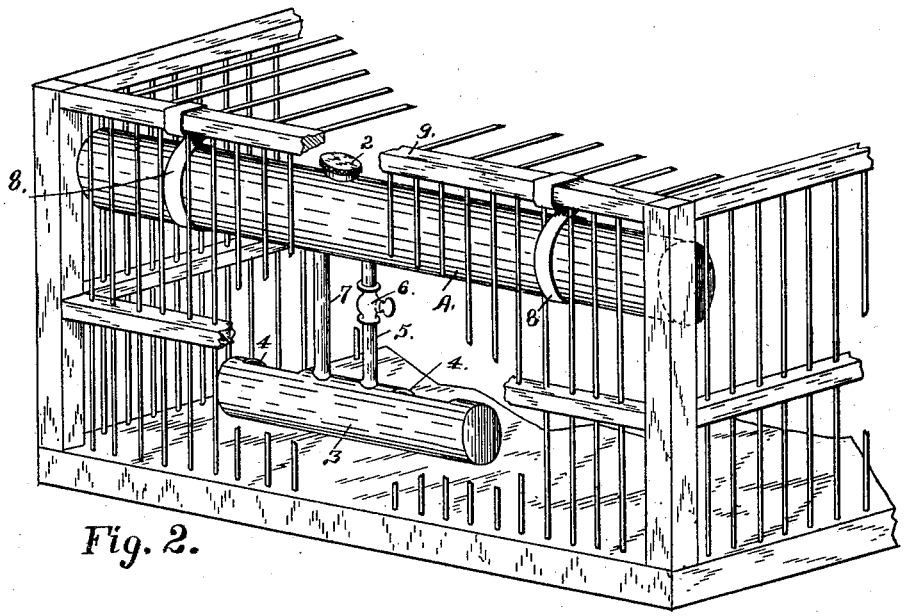

Referring to the accompanying drawings, Figure 1 is a front view with a portion broken away to show central longitudinal vertical section. Fig. 2 is a perspective view of the fountain.

It is the object of my invention to provide a conveniently-adjustable and automatic water-supply which is especially designed for fowls in confinement and those being transported in crates from place to place. For this purpose I provide a reservoir A, which may be made cylindrical or oval, having the greatest depth vertically and having a sufficient length to extend to a considerable distance horizontally along the space within which it is contained. This enables me to provide a sufficient supply for a number of confined fowls, and to so construct the device that it may be contained within the crate or inclosure without greatly encroaching upon the space. This reservoir is hermetically closed at the ends and upon the top is provided with a screw-cap or other tight closure 2, which can be removed for the purpose of filling the reservoir and afterward replaced, so that the device is hermetically closed. 3 is a second similarly-shaped reservoir having openings 4 upon the upper side.

5 is a water-conducting pipe extending from the upper reservoir to the lower and having in it a cock 6, which may be closed while the upper reservoir is being filled and is afterward opened to allow the water to pass from the upper to the lower reservoir. In order to allow the water to thus pass, a second pipe 7 extends from the upper part of the reservoir A into the lower reservoir 3, both ends being open and the lower end terminating at a point where it will be covered when the desired level of water in the lower reservoir is reached. The water-pipe opens into the bottom of the upper reservoir and extends down into the lower reservoir to a point below the level of the water therein. The openings in the lower reservoir are of any desired form and size, but are small enough so that the water cannot be easily fouled.

8 represents hangers of any desired description by which the reservoir may be attached to the top bar 9 of the crate or to other convenient point from which the reservoir is to be suspended. These hangers may be bent or otherwise lengthened or shortened, so that the lower reservoir will be located at a convenient height for the fowls which are to use it. Thus for very small chickens the device would be lowered and for larger fowls it may be raised. When it is applied to crates, the upper reservoir will preferably be extended along one side and near the top of the crate and the lower one will lie close against the side of the crate in line beneath it.

The cock 6 is placed upon one side of the water-pipe and within easy reach from the outside through the gratings of the crate.

The whole device forms a convenient water-supply for fowls in confinement, and its peculiar construction prevents the spilling and loss of water in handling the crates.

The openings 4 are made in the upper part of the lower reservoir and do not extend to the ends thereof; but these ends form cylindrical cups beyond the ends of the drinking-openings, so that if the crate is somewhat turned or inclined the water will flow into these ends and be prevented from escaping, and when the crate again resumes its horizontal position the water will return to the lower portion of the reservoir.

Having thus described my invention, what I claim, and desire to secure by Letters Patent, is—

1. In a drinking-fountain for crated fowls the combination of two cylindrical reservoirs having a greater length than width, a tubular connection between said reservoirs and suspending one from the other, one of said reservoirs being closed and having a filling-opening and the other reservoir having a plurality of openings in its upper surface to afford access to the contained water, an air-pipe leading from the space above the water of the upper reservoir into the lower reservoir, and hangers by which the reservoirs are detachably suspended in the crate.

2. The combination of two closed cylinders and hangers whereby they may be detachably and adjustably suspended inside of a crate so that they will be above the bottom of the latter, a tubular connection leading from the lower part of the upper reservoir to a point near the bottom of the lower reservoir said connection having a valve controlling the water-supply to the lower reservoir, and said lower reservoir having its upper surface formed with drinking-openings, said cylinders suspended one from the other and lying in different horizontal levels, and an air-pipe extending from the air-space of the upper reservoir to a point below the water-line of the lower reservoir.

3. The combination in a poultry-fountain of a horizontal tubular closed reservoir, hangers by which it may be removably attached to the upper part of a crate, a second reservoir parallel with and at a distance beneath the upper one, a water-pipe extending from the bottom of the upper reservoir to a point beneath the surface of the water in the lower one, an air-pipe extending from approximately the water-level of the lower reservoir to the upper part of the upper one, drinking-openings in the upper part of the lower reservoir, said openings not extending to the ends of the reservoir whereby said ends form cup-shaped receptacles substantially as herein described.

In witness whereof I have hereunto set my hand.

FREDERICK POHLEY.

Witnesses:
S. H. NOURSE,
JESSIE C. BRODIE.